United States Patent
Kanno et al.

(10) Patent No.: US 8,851,115 B2
(45) Date of Patent: Oct. 7, 2014

(54) COUPLER

(75) Inventors: Minoru Kanno, Kanagawa (JP); Kenji Yoshihiro, Kanagawa (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 234 days.

(21) Appl. No.: 13/581,842

(22) PCT Filed: Nov. 9, 2010

(86) PCT No.: PCT/JP2010/069904
§ 371 (c)(1),
(2), (4) Date: Aug. 30, 2012

(87) PCT Pub. No.: WO2011/108145
PCT Pub. Date: Sep. 9, 2011

(65) Prior Publication Data
US 2013/0008539 A1 Jan. 10, 2013

(30) Foreign Application Priority Data

Mar. 3, 2010 (JP) ................................ 2010/046207

(51) Int. Cl.
*F16L 37/098* (2006.01)
*F16L 37/133* (2006.01)
*F16L 37/32* (2006.01)
*H01M 8/04* (2006.01)
*F16L 37/40* (2006.01)
*H01M 8/10* (2006.01)

(52) U.S. Cl.
CPC .............. *F16L 37/40* (2013.01); *H01M 8/1011* (2013.01); *H01M 8/04201* (2013.01); *F16L 37/0985* (2013.01); *Y02E 60/50* (2013.01); *H01M 8/04186* (2013.01); *H01M 8/04208* (2013.01)
USPC .................... 137/614.04; 251/149.6; 285/322

(58) Field of Classification Search
USPC ............. 137/614.02, 614.03, 614.04, 614.05; 251/146, 149, 149.1, 149.3, 149.6, 251/149.8, 149.9; 285/322, 921
See application file for complete search history.

(56) References Cited

U.S. PATENT DOCUMENTS 2,444,451 A * 7/1948 Kelso ......................... 251/149.9
2,819,914 A * 1/1958 Eitner ............................. 285/70
(Continued)

FOREIGN PATENT DOCUMENTS

CN 1268213 A 9/2000
CN 101120198 A 2/2008
(Continued)

OTHER PUBLICATIONS

Kou, You "First Office Action for Chinese Patent Application No. 2010800665838," The State Intellectual Property Office of The People's Republic of China, Mar. 24, 2014 (translation and original).

(Continued)

*Primary Examiner* — John Rivell
*Assistant Examiner* — Frederick D Soski
(74) *Attorney, Agent, or Firm* — Florek & Endres PLLC

(57) ABSTRACT

Coupling holding means 50 comprising retainers 53 and retainer engaging portions 52 for holding a coupled state is provided between a socket S10 and a plug P10 of a coupler. Engaging pawl portions 54 are formed on the inner sides of a pair of retainers 53 provided on both sides of a nozzle portion 32. By causing the retainers 53 to move outwardly in a coupling operation, a gap between the retainers 53 and the nozzle portion 32 can be made small. By forming interference preventing portions 58 in the engaging pawl portions 54, the retainers 53 can be provided at a smaller interval than the outer diameter of the nozzle portion 32 whereby the coupler can be made even more compact. Further, by forming the retainers 53 higher than the foremost end portion of the nozzle portion 32, the nozzle portion 32 can be protected by the retainers 53 even in an unexpected event such as falling and damage will not extend directly to the nozzle portion 32.

8 Claims, 12 Drawing Sheets

(56) References Cited

U.S. PATENT DOCUMENTS

| | | | | |
|---|---|---|---|---|
| 4,458,719 | A | * | 7/1984 | Strybel ............... 137/614.03 |
| 4,681,350 | A | * | 7/1987 | Gaita ....................... 285/315 |
| 5,564,471 | A | * | 10/1996 | Wilder et al. ......... 137/614.04 |
| 5,897,142 | A | * | 4/1999 | Kulevsky ................. 285/308 |
| 6,161,579 | A | * | 12/2000 | Vulliet ................. 137/614.05 |
| 6,343,630 | B1 | * | 2/2002 | Dubinsky ................... 141/385 |
| 2004/0074541 | A1 | * | 4/2004 | Sharpe ................. 137/614.04 |
| 2004/0150223 | A1 | * | 8/2004 | Campau ................... 285/308 |
| 2007/0114794 | A1 | | 5/2007 | Frost et al. |
| 2008/0041468 | A1 | | 2/2008 | Yoshihiro et al. |
| 2009/0001722 | A1 | | 1/2009 | Yoshihiro et al. |
| 2009/0033091 | A1 | * | 2/2009 | Tsai ....................... 285/322 |

FOREIGN PATENT DOCUMENTS

| | | | |
|---|---|---|---|
| CN | 101405530 | A | 4/2009 |
| JP | 2007085471 | A | 4/2007 |
| JP | 2007-085471 | | 5/2007 |
| JP | 2007-132473 | | 5/2007 |
| JP | 2007132472 | A | 5/2007 |
| JP | 2007-218387 | | 8/2007 |
| JP | 2007-311292 | | 11/2007 |

OTHER PUBLICATIONS

International Searching Authority, Japanese Patent Office, "International Search Report for International Application No. PCT/JP2010/069904," Feb. 15, 2011.
International Searching Authority, Japanese Patent Office, "Written Opinion of the International Searching Authority for International Application No. PCT/JP2010/069904," Sep. 3, 2012.
Nakamura, Yukari, "International Preliminary Report on Patentability for International Application No. PCT/JP2010/069904," Sep. 4, 2012.

* cited by examiner

- PRIOR ART -

COUPLER

TECHNICAL FIELD

This invention relates to a coupler comprising a socket and plug which are detachably coupled to each other and, more particularly, to a coupler of this type by which liquid or other material can be easily shifted from a container to another container provided on the side of a main body or, alternatively, a container containing such liquid or other material can be exchanged per se by another one and which can maintain a coupled state accurately. The coupler is particularly suitable when it is used as a coupler provided between a cartridge container for a methanol fuel cell and a fuel cell main body.

BACKGROUND ART

There are many cases where it is necessary to supplement liquid such as a raw material which decreases by operation or use of an equipment or apparatus. In such cases, supply of liquid such as a raw material is made by coupling a cartridge container to a container provided on the side of a main body of an equipment or apparatus for shifting the liquid between the two containers or by exchanging a container provided on the main body with another container. In a methanol fuel cell also, supplement of methanol as a fuel becomes necessary.

Various detachable types of couplers are used for simply performing such coupling or exchanging between two containers. These couplers comprise a socket having a valve and energizing means for energizing the valve in a closing direction, and a plug having a valve, energizing means for energizing the valve of the plug in a closing direction and a nozzle portion which can be detachably fitted and coupled with the socket. The plug can communicate with the socket by opening the valve of the plug and the valve of the socket when the fitted and coupled state of the socket and the plug has been completed. The valves of the plug and the socket are closed when the plug is released from the socket.

In this type of coupler, unless the coupled state between the socket and the plug is maintained accurately, leakage of liquid or other material will take place in a coupled portion of the coupler.

It has therefore been proposed to provide a mechanism which will hold the coupling state between the socket and the plug. For example, in Patent Literature 1, as shown in FIG. 11, a pair of lock arms 2 projecting on both sides of a nozzle 1 are provided in a plug P of a coupler while an engaging recesses 3 in which the lock arms 2 are received are provided in a socket S of the coupler. A coupled state can be maintained by causing projecting portions 4 of the lock arms 2 to engage with stepped portions 5 of the engaging recesses 3 by utilizing elastic deformation.

In Patent Literature 2, as shown in FIG. 12, a nozzle 6 of a plug P of a coupler for a fuel cell is formed in its foremost end portion with a peripheral groove 7 while four hooks 9 are provided in a socket S in such a manner that they project inwardly from outside of a recess 8 in which the nozzle 6 is inserted. These hooks 9 are elastic members and energized in a manner to project forwardly and, after an overriding operation of the hooks 9, the hooks 9 are engaged with the peripheral groove 7 to hold the coupled state.

PRIOR ART LITERATURE

Patent Literature

Patent Literature 1: Japanese Patent Application Laid-open Publication No. 2007-85471
Patent Literature 2: Japanese Patent Application Laid-open Publication No. 2007-311292

SUMMARY OF THE INVENTION

Problem to be Solved by the Invention

In the mechanism in which the coupled state between the socket S and the plug P is held by using the lock arms 2, in a case where such mechanism is used, for example, as a coupler for supplementing fuel of a methanol fuel cell or a coupler for supplementing fuel by exchanging the container per se, when it becomes necessary to apply such mechanism to devices having a thin main body such as a mobile phone and a portable type audio device, the lock arms 2 which are provided on both sides of the nozzle 1 become large relative to the outer diameter of the nozzle 1 and hence the coupler which uses the lock arms 2 also become large with resulting difficulty in mounting this mechanism on such devices having a thin main body.

On the other hand, in the mechanism in which the coupled state is held by forming the peripheral groove 7 in the foremost end portion of the nozzle 6 and causing the hooks 9 to engage with the groove 7, when the nozzle 6 has a small diameter, the hooks 9 of the corresponding socket S must also be made in a small size with a result that processing of such small sized hooks becomes difficult or securing of strength of the nozzle itself becomes difficult because the peripheral groove 7 must be formed in the foremost end portion of the small diameter nozzle 6.

Aside from the problem of holding the coupled state, there is also a problem that when the nozzle of the plug is of a small diameter, the plug tends to be damaged due to an unexpected accident such as falling of the plug.

The present invention has been made for solving the above described problems of the prior art. It is an object of the invention to provide a coupler which is easy to operate in spite of an ultra small size of the coupler and which is protected in the foremost end portion of the nozzle from an unexpected accident such as falling.

Means for Solving the Problem

For solving the problems of the prior art, a coupler of claim 1 is characterized by comprising a socket having a valve and energizing means for energizing the valve in a closing direction, and a plug having a valve, energizing means for energizing the valve of the plug in a closing direction and a nozzle portion which can be detachably fitted and coupled with the socket, said plug being capable of communicating with the socket by opening the valve of the plug and the valve of the socket in the fitted and coupled state, wherein coupling holding means for holding the coupled state comprising a retainer and a retainer engaging portion is provided between the socket and the plug, a pair of said retainer are provided oppositely across the nozzle portion of the plug, a projecting engaging pawl portion which is engaged with the retainer engaging portion is formed in a top inside portion of each of the opposing retainers, the pair of the engaging pawl portions of the retainers are provided at an interval which is equal to or smaller than the outer diameter of the nozzle portion, and the pair of the retainer are formed higher than the foremost end portion of the nozzle portion.

A coupler defined in claim 2 is characterized in that, in addition to the structure as defined in claim 1, the engaging pawl portions of the retainers are each formed with an interference preventing portion for preventing interference with the nozzle portion.

A coupler defined in claim 3 is characterized in that, in addition to the structure as defined in claim 1 or 2, the retainers each have a thin portion in a middle portion which constitutes a fulcrum of elastic deformation and the engaging pawl portions of the retainers are formed as a thick portion.

A coupler defined in claim 4 is characterized in that, in addition to the structure as defined in any of claims 1-3, the retainers are rotatable about the nozzle portion.

A coupler defined in claim 5 is characterized in that, in addition to the structure as defined in claim 4, the retainers each have an overriding portion which can restrict a position of rotation between the retainers and the nozzle portion.

A coupler defined in claim 6 is characterized in that, in addition to the structure as defined in any of claims 1-5, the retainers each have a cam mechanism which, when twisting force is applied in the engaged state of the retainers, releases the retainers from the engaged state.

A coupler defined in claim 7 is characterized in that, in addition to the structure as defined in claim 6, the cam mechanism comprises a cam provided in the plug and a cam follower which is a release ring provided reciprocably in the retainers.

A coupler defined in claim 8 is characterized in that, in addition to the structure as defined in any of claims 1-7, width of the retainers is within a range from 2.8 mm to 4.0 mm and distance between the outsides of the retainers is within a range from 6.0 mm to 10.0 mm.

A coupler defined in claim 9 is characterized in that, in addition to the structure as defined in any of claims 1-8, the socket is mounted in substantially a central portion of an insertion opening for receiving the retainers and the retainer engaging portions are provided in a space outside of the socket whereby a recess in which the insertion opening and the retainer engaging portions are integrally formed is provided.

Advantageous Results of the Invention

According to claim 1, there is provided a coupler comprising a socket having a valve and energizing means for energizing the valve in a closing direction, and a plug having a valve, energizing means for energizing the valve of the plug in a closing direction and a nozzle portion which can be detachably fitted and coupled with the socket, said plug being capable of communicating with the socket by opening the valve of the plug and the valve of the socket in the fitted and coupled state, wherein coupling holding means for holding the coupled state comprising a retainer and a retainer engaging portion is provided between the socket and the plug, a pair of said retainer are provided oppositely across the nozzle portion of the plug, a projecting engaging pawl portion which is engaged with the retainer engaging portion is formed in a top inside portion of each of the opposing retainers, the pair of the engaging pawl portions of the retainers are provided at an interval which is equal to or smaller than the outer diameter of the nozzle portion, and the pair of the retainer are formed higher than the foremost end portion of the nozzle portion. Since the engaging pawl portions are formed on the inside of the pair of retainers on the opposite sides of the nozzle portion, the engaging pawl portions are moved outwardly in the engaging operation and, in an initial state, the gap between the nozzle portion can be made small and, simultaneously, the environment surrounding the nozzle portion can be protected. Further, since the retainers are higher than the foremost end portion of the nozzle portion, in a case of an unexpected accident such as falling, the nozzle portion can be protected by the retainers so that no damage extends directly to the nozzle portion.

According to claim 2, there is provided a coupler wherein the engaging pawl portions of the retainers are each formed with an interference preventing portion for preventing interference with the nozzle portion. By forming the interference preventing portion in the engaging pawl portions, it becomes possible to provide the engaging pawl portions with an interval which is smaller than the outer diameter of the nozzle portion whereby the coupler can be made even more compact.

According to claim 3, there is provided a coupler wherein the retainers each have a thin portion in a middle portion which constitutes a fulcrum of elastic deformation and the engaging pawl portions of the retainers are formed as a thick portion. By this arrangement, strength which is necessary for maintaining the coupled state can be secured and strength against falling can also be increased. By forming a thin portion in a middle portion which constitutes a fulcrum of elastic deformation, the coupling operation can be made simple and the amount of displacement can be made smaller than in a case where the retainers are elastically deformed in the vicinity of the foremost end portion thereof whereby the coupler can be made even more compact.

According to claim 4, there is provided a coupler wherein the retainers are rotatable about the nozzle portion. Therefore, even if twisting force is applied in the coupled state, damage to the retainers or the socket can be prevented.

According to claim 5, there is provided a coupler wherein the retainers each have an overriding portion which can restrict a position of rotation between the retainers and the nozzle portion. By restricting the position of rotation, the position of the retainers can be ascertained even in a case where the retainers are rotatable whereby the coupling operation can be made in a simple manner.

According to claim 6, there is provided a coupler wherein the retainers each have a cam mechanism which, when twisting force is applied in the engaged state of the retainers, releases the retainers from the engaged state. Therefore, even if twisting force is applied in the coupled state, the coupled state can be released by the cam mechanism whereby damage to the coupler can be prevented.

According to claim 7, there is provided a coupler wherein the cam mechanism comprises a cam provided in the plug and a cam follower which is a release ring provided reciprocably in the retainers. By constituting the cam mechanism with the cam on the plug side and the cam follower provided in the release ring of the retainers, the cam mechanism can be provided simultaneously with making the coupler compact.

According to claim 8. there is provided a coupler wherein width of the retainers is within a range from 2.8 mm to 4.0 mm and distance between the outsides of the retainers is within a range from 6.0 mm to 10.0 mm. By this arrangement, the coupler can be made compact and can be mounted on devices having a thin main body such as a mobile phone and portable type audio devices. Since the foremost end portion becomes rectangular, direction in coupling can be recognized easily.

According to claim 9, there is provided a coupler wherein the socket is mounted in substantially a central portion of an insertion opening for receiving the retainers and the retainer engaging portions are provided in a space outside of the socket whereby a recess in which the insertion opening and the retainer engaging portions are integrally formed is provided. Since the insertion opening on the socket side and the retainer engaging portion are formed as an integral recess whereby the socket can also be made compact.

DESCRIPTION OF PREFERRED EMBODIMENTS

Figure 1:
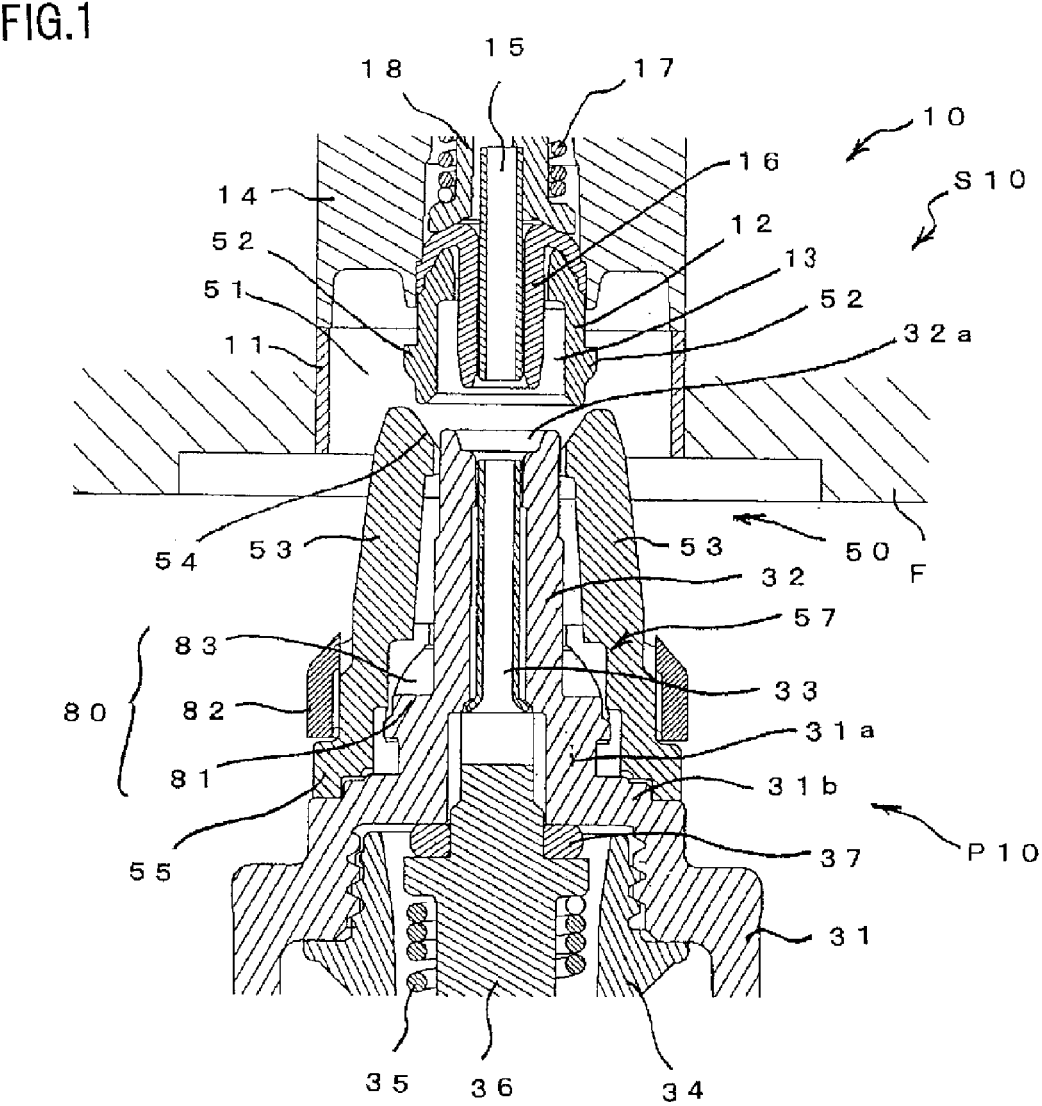
FIG. 1 is a vertical sectional view of an embodiment of a coupler before a socket and a plug are coupled.
Figure 2:
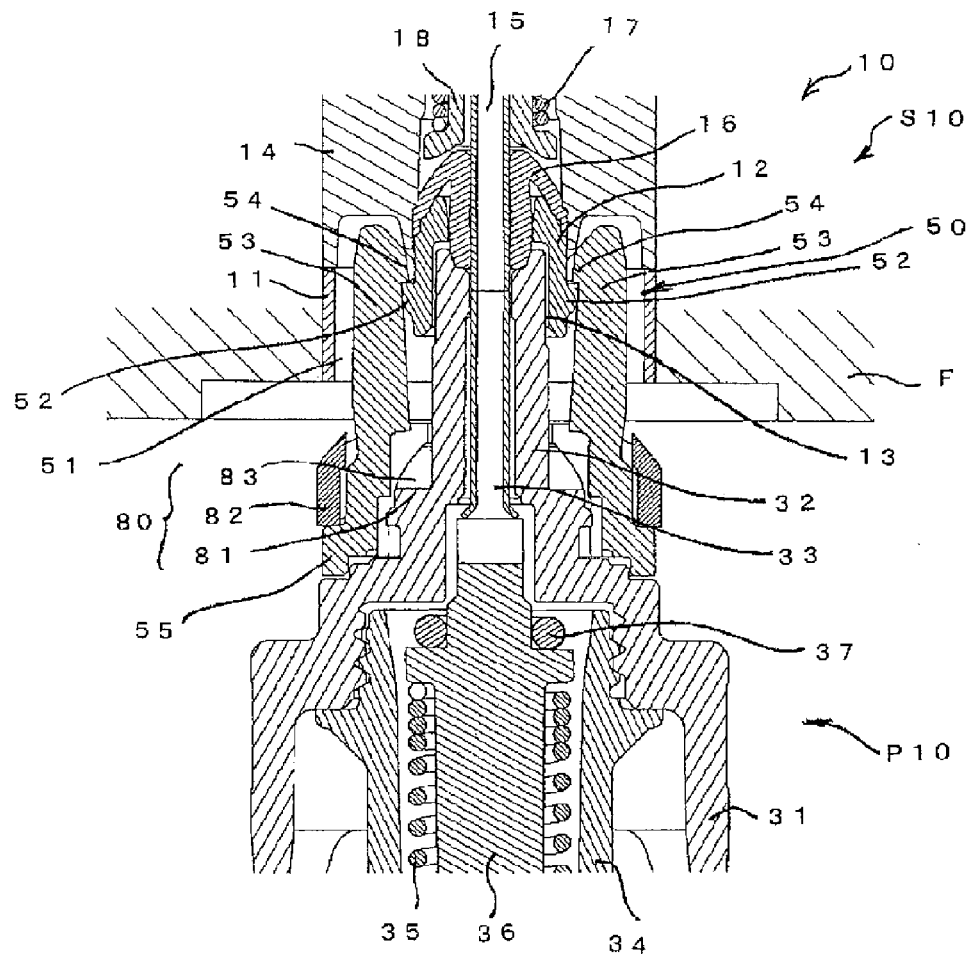
FIG. 2 is a vertical sectional view of the embodiment of the coupler in which the socket is coupled with the plug.
Figure 3:
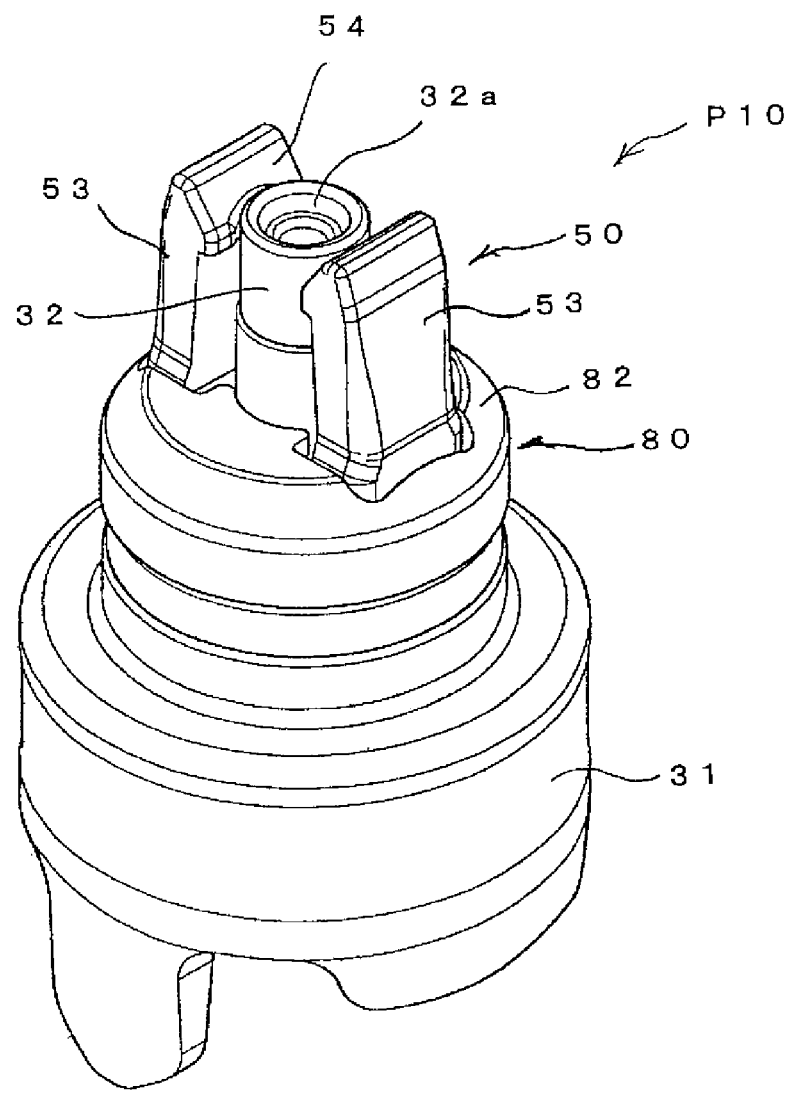
FIG. 3 is a perspective view of the plug of the embodiment of the coupler.

Description will now be made in detail about embodiments of the invention with reference to the accompanying drawings.

A coupler 10 is composed of a socket S10 and a plug P10 which is fitted and coupled with the socket S10. The socket S10 is provided on the main body side of, for example, a methanol fuel cell and the plug P10 is provided on the side of a cartridge as a methanol container and they communicate with each other to be used for supplying fuel to the main body side or for exchanging the cartridge per se. For the main portion of the socket S10 and the plug P10 are preferably used a metal material and a non-metal material, e.g., synthetic resin such as polypropyrene, polyphenyrene sulfide and polyacetal.

The following description will be made on the basis of the vertical direction in the drawings but the description does not restrict the direction of actual mounting on a container main body but mounting may be made in any direction.

In the socket S10 of this coupler 10, a generally cylindrical socket main body 12 which constitutes a part of a coupler main body is mounted on a member F which is attached to a fuel cell main body as an integral or separate member via a socket holding frame member 11 which has a recessed space constituting an insertion opening. The socket main body 12 is formed in its foremost end portion (the lower portion as viewed in the drawing) with a plug insertion opening 13 which constitutes an insertion opening in which the plug P10 constituting a pair with the socket is inserted and coupled. The base portion side (the upper portion side as viewed in the drawing) of the socket main body 12 is connected to a valve holder 14 having an opening of a generally cylindrical configuration with a bottom (illustration of a part of the valve holder is omitted). The valve holder 14 is formed in its lower portion with a communication opening which communicates with the container main body.

In the central portion of the socket main body 12 is provided a socket side operation member 15 made of a pipe for functioning as a communication path and performing valve opening and closing operations. A seal member 16 having a cylindrical portion and diaphragm portion having a J-shaped section which is formed integrally with the cylindrical portion is mounted between the socket side operation member 15 and the socket main body 12. A valve main body 18 which is energized by a compression coil spring 17 is slidably accommodated in the valve holder 14. The top portion of the diaphragm portion of the seal member 16 serves as a valve seal portion.

By this arrangement, when the valve main body 18 is pushed by the socket side operation member 15 against the force of the compression coil spring 17 by coupling of the socket with the plug, a gap is formed between the valve main body 18 and the seal member 16 and the valve main body 18 thereby is automatically opened. Thus, the bottom portion of the valve holder 14 communicates with the inside of the fuel cell main body through the central portion, lower portion, lower peripheral portion of the pipe of the socket side operation member 15 (inner periphery of the valve main body), and the space between the valve main body 18 and the seal member 16.

The plug P10 of the coupler 10 which is fitted and coupled with the socket S10 is mounted, as shown in FIG. 1, on the outer periphery of the foremost end portion of a container which constitutes a container main body in which methanol as fuel of a fuel cell is contained. The plug P10 has a plug main body 31 of a generally four step cylindrical configuration which constitutes a part of the coupler main body and is screwed onto the container. This plug main body 31 is formed with a projecting connecting portion 32 projecting from the foremost end portion of the plug main body and constituting a nozzle portion which is mounted in the plug insertion opening 13 of the socket S10. The nozzle portion is formed generally as a cylinder having the smallest diameter. The projecting connecting portion 32 is formed with a seal recess 32a at the foremost end portion. A plug side operation member 33 made of a pipe is mounted in the central portion of the projecting connecting portion 32.

By this arrangement, seal of the coupler in the coupled state can be achieved by contact between the outer peripheral surface of the foremost end portion of the seal member 16 for the socket side operation member 15 of the socket S10 and the seal recess 32a.

A valve holder 34 (illustration of a part thereof is omitted) is connected to the base portion (lower portion in the drawing) of the plug side operation member 33 of the plug main body 31. A communication groove which communicates with the inside of the container is formed in the bottom portion of the valve holder 34. A valve main body 36 which is energized by a compression coil spring 35 is slidably accommodated in the valve holder 34. A valve seal member 37 composed of an O-ring is mounted on the outer periphery of the upper portion of the valve main body 36 and a space between the valve seal member 37 and a stepped portion of the plug main body 31 can be opened and closed.

By this arrangement, when the valve main body 36 is pushed by the plug side operation member 33 against the force of the compression coil spring 35 by coupling of the socket with the plug, a gap is formed between the valve main body 36 and the seal member 37, or between the seal member 37 and the stepped portion of the plug main body 31, and the valve main body 36 thereby is automatically opened. Thus, communication is achieved through the central portion of the pipe of the plug side operation member 33, the space between the valve main body 36 and the seal member 37 or between the seal member 37 and the stepped portion of the plug main body 31, the communication groove of the bottom portion of the valve holder 34 and the inside of the container.

In this coupler 10, coupling holding means 50 for holding the coupled state between the socket S10 and the plug P10 is provided. One side of the coupling holding means is provided in the socket S10 in the form of, for example, retainer engaging portions 52 provided in the engaging recess 51 and the other side of the coupling holding means 50 which is engaged with the retainer engaging portions 52 of the engaging recess 51 is provided in the plug P10 in the form of, for example, retainers 53 and their engaging pawl portions 54. The plug P10 and the socket S10 are coupled and the coupled state can be maintained by a single action of pushing by which they override each other whereas they are released from the coupled state by a single action of pulling. Thus, supply of fuel or the like can be made in a stably coupled state.

Figure 9A:
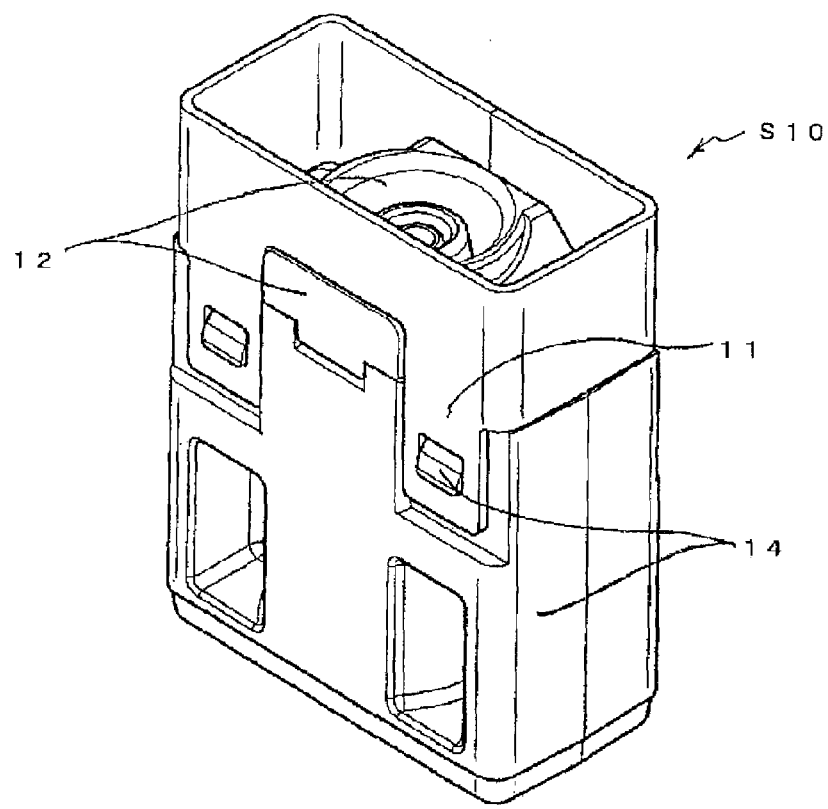
FIGS. 9A and 9B are a perspective view and a plan view of the socket of the embodiment of the coupler.
Figure 9B:
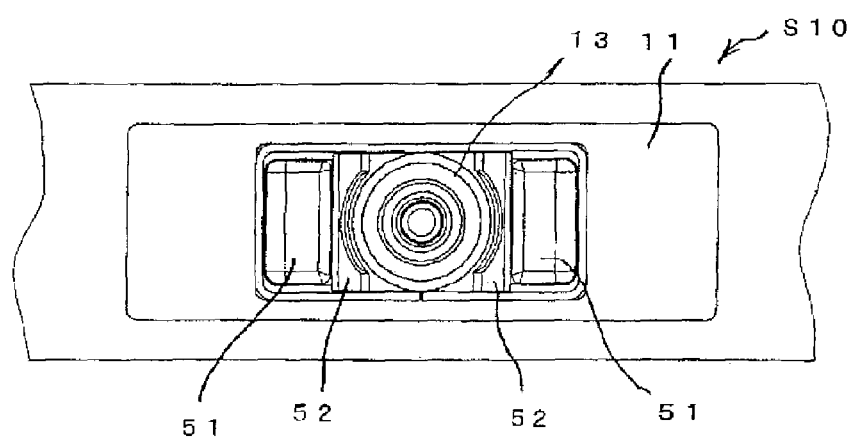

In the socket S10 of this coupler 10, the recessed space of the socket holding frame member 11 mounted on the member F of the fuel cell main body is used as the engaging recess 51. The socket main body 12 is provided in the engaging recess 51. On the outside of the foremost end portion of the socket main body 12 are provided a pair of the retainer engaging portions 52 which constitute one side of the coupling holding means 50 on both sides of the socket main body 12. As shown in FIGS. 9A and 9B, the engaging recess 51 on both sides and the central socket insertion opening for inserting the socket main body 12 constitute an integral recess.

A pair of the retainer engaging portions 52 having a shape of a penthouse are formed on the outer periphery of the socket main body 12 located in the central portion of the engaging recess 51 in manner to project from the central axis toward the outside. Each of the retainer engaging portions 52 has an inclined surface in the foremost end portion and has a stepped surface falling at right angle in the base portion. The retainer engaging portions 52 and the engaging recess 51 constitute a recess for receiving the retainers 53. When the retainer pawl portions 54 of the retainers 53 which constitute the other side of the coupling holding means have smoothly overridden the retainer engaging portions 52, the coupling has been accurately achieved.

In other words, in the socket S10 of the coupler, the socket S10 is mounted in substantially the central portion of the insertion opening for receiving the pair of retainers 53 to be coupled with the projecting connecting portion constituting the nozzle portion of the plug P10 and the retainer engaging portions 52, 52 are provided on the outer periphery of the socket S10 and, by this arrangement, the recess can be formed integrally with the insertion opening for receiving the pair of retainers 53, 53.

In this socket S10, as shown in FIG. 9A, pawls of the valve holder 14 are engaged with the holes formed in the lower end portion of the socket holding frame member 11 to hold the socket main body 12 with the valve holder 14 and the socket holding frame member 11.

By forming the engaging recess 51 and the retainer engaging portions 52 outside of the plug connecting opening 13 of the socket main body 12 across the central axis of the coupler 10, elongated engaging recess 51 is provided in the direction crossing thickness of the main body F of the device such as a fuel cell whereby space for the device can be held to minimum and the coupling holding means 50 can be provided easily in a thin device.

Further, since the engaging recess 51 and the socket main body 12 are made in the integral recess, it can be utilized as a guide in case the socket S10 is coupled with the plug P10.

In the plug P10 of the coupler 10, as shown in FIGS. 1, 2, 3, 5 and 6, the upwardly projecting retainers 53 made of a pair of lock arms are provided across the projecting connecting portion 32 constituting the nozzle portion as the other part of the coupling holding means 50 for maintaining the coupled state with the socket S10 in correspondence to the engaging recess 51 and the retainer engaging portions 52 of the socket S10. The retainers 53 which are separate member from the plug main body 31 are provided rotatably about the central axis of the plug P10.

Figure 4A:
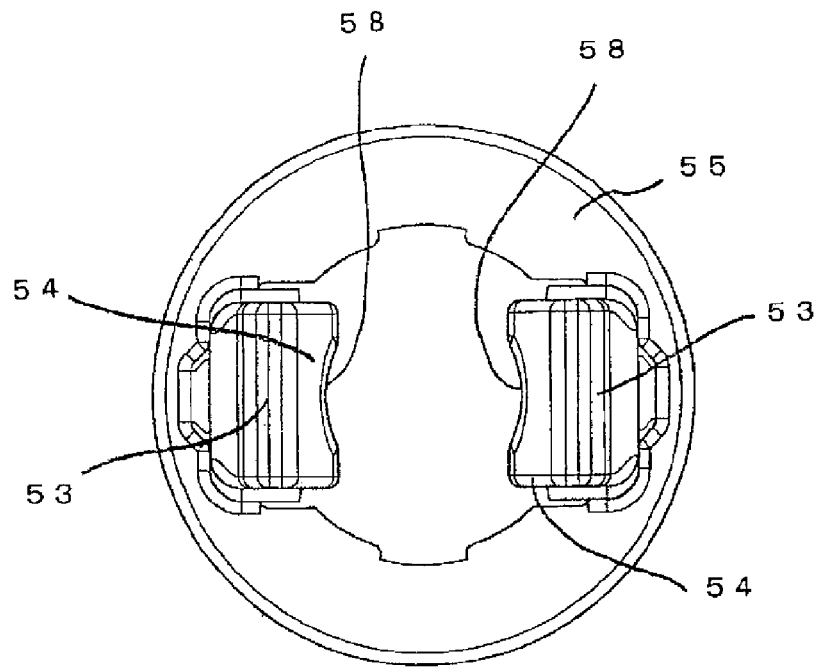
FIGS. 4A and 4B are a plan view and a perspective view of a retainer portion of coupling holding means of the embodiment of the coupler.
Figure 4B:
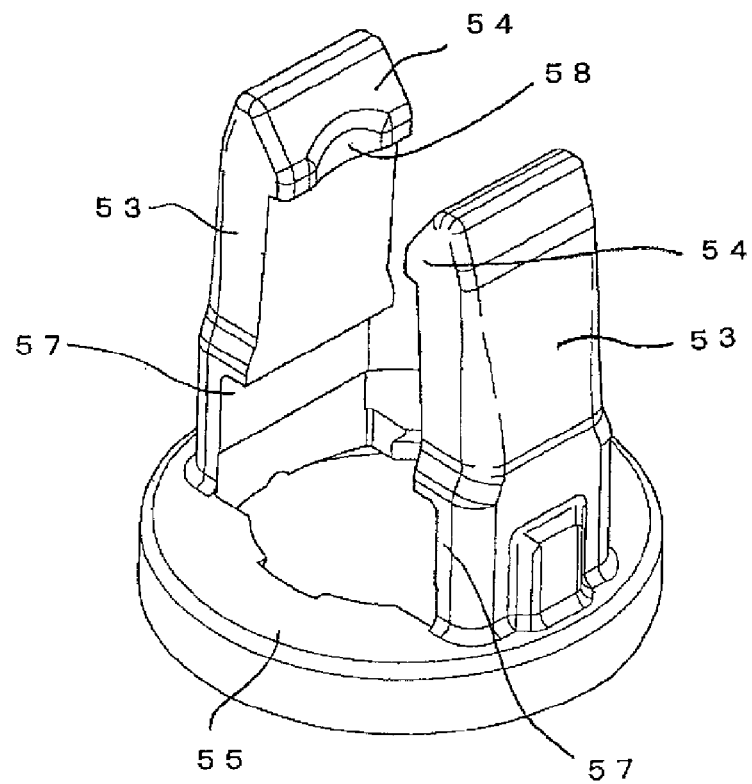

In each of the retainers 53, as shown in FIG. 4, the engaging pawl portion 54 is formed in a manner to project inwardly of the foremost end portion of the retainer 53. The retainers 53 have the ring portion 55 of a substantially circular disk configuration at the base of the retainers 53. The ring portion 55 is fitted in its opened portion with a shall diameter portion 31a in the middle portion of the plug main body 31 and is placed on a large diameter portion 31b in the middle portion of the plug main body 31 in such a manner that the ring portion 55 is rotatable about the central axis of the plug P10. On the disk of the ring portion 55 are integrally formed the pair of retainers 53 in such a manner that the retainers 53 project substantially upwardly and incline inwardly. On the inner side of the foremost end portion of each of the retainers 53, there is formed the projecting engaging pawl portion 54 which is engaged with the retainer engaging portion 52 in the engaging recess 51. The engaging pawl portion 54 has an inclined portion in the foremost end portion and a stepped portion in the base portion so that coupling and decoupling are achieved by an overriding operation relative to the retainer engaging portion 52.

In the rear surface of the ring portion 55, a plurality of recesses formed in radial direction are formed at an equal circumferential interval. In a horizontal surface of the plug main body 31, overriding portions 56 in the form of projections are formed in correspondence to the recesses of the ring portion 55. Position of rotation of the retainers 53 can be restricted by these recesses and the overriding portions 56.

The pair of retainers 53 which are provided across the projecting connecting portion 32 constituting the nozzle portion are formed higher than the foremost end portion of the projecting connecting portion 32. By this arrangement, even when the plug P10 has fallen accidentally, damage to the projecting connecting portion 32 constituting the nozzle portion will be prevented.

Figure 8:
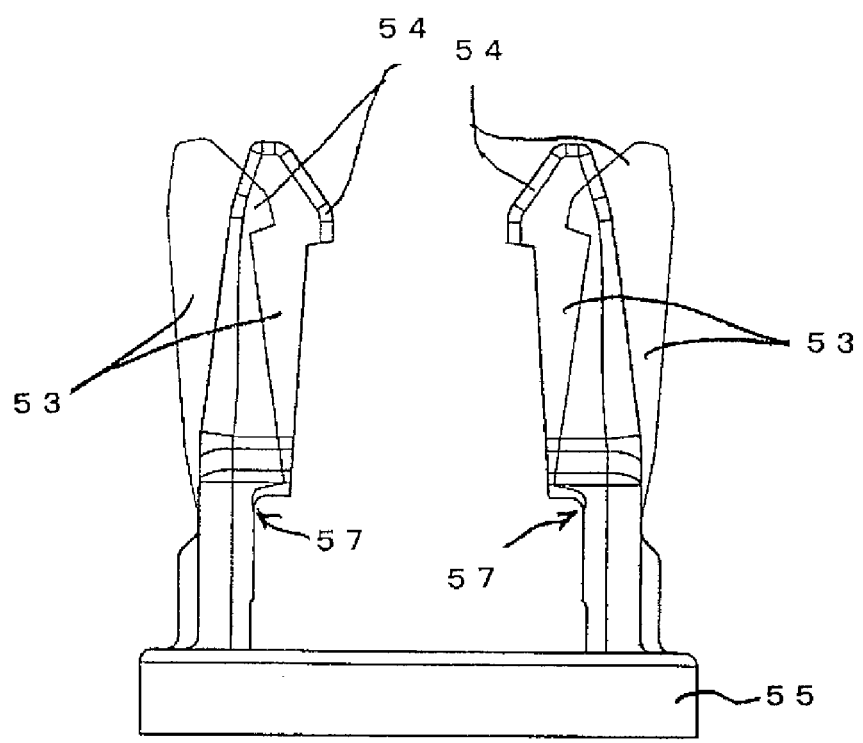
FIG. 8 is an explanatory view extracting and showing retainers of the embodiment of the coupler.

In order to make the coupling holding means 50 as compact as possible and thereby realize minimization of the device, as shown in FIGS. 4 and 8, the middle portion of retainer 53 is made thin to provide a thin portion 57 while the foremost end portion and the base portion on both sides of the middle portion are made thick so that the thin portion 57 in the middle portion will constitute a fulcrum of elastic deformation and necessary displacement can thereby be secured and strength necessary for maintaining the coupled state can also be secured.

Each of the engaging pawl portions 54 formed in the inner side of the foremost end portion of the retainers 53 is partly arcuately removed to form an interference preventing portion 58 for preventing interference with the projecting connecting portion 32 constituting the nozzle portion. By making the interval between the engaging pawl portions 54 of the retainers 53 smaller than the outer diameter of the projecting connecting portion 32 constituting the nozzle portion and thereby disposing the engaging paw portions 54 as near to the projecting connecting portion 32 as possible and by causing the retainers 53 to elastically deform outwardly, approaching at the initial state is made possible and compact design and minimization can be realized.

The projecting base portion of the engaging pawl portion 54 is formed in a straight flat surface in correspondence to the penthouse shape of the retainer engaging portion 52 so that stress during coupling operation will disperse uniformly.

Figure 6A:
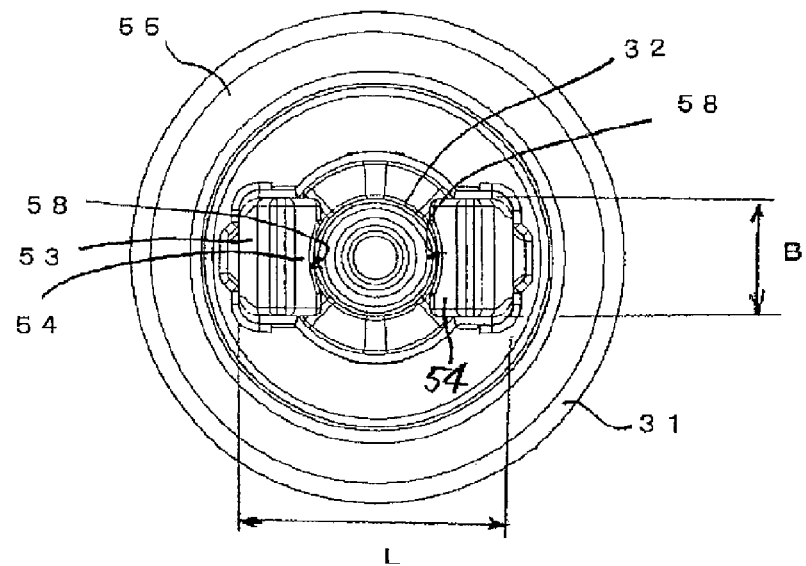
FIGS. 6A and 6B are a plan view and a perspective view of a plug portion and a retainer portion of the embodiment of the coupler.
Figure 6B:
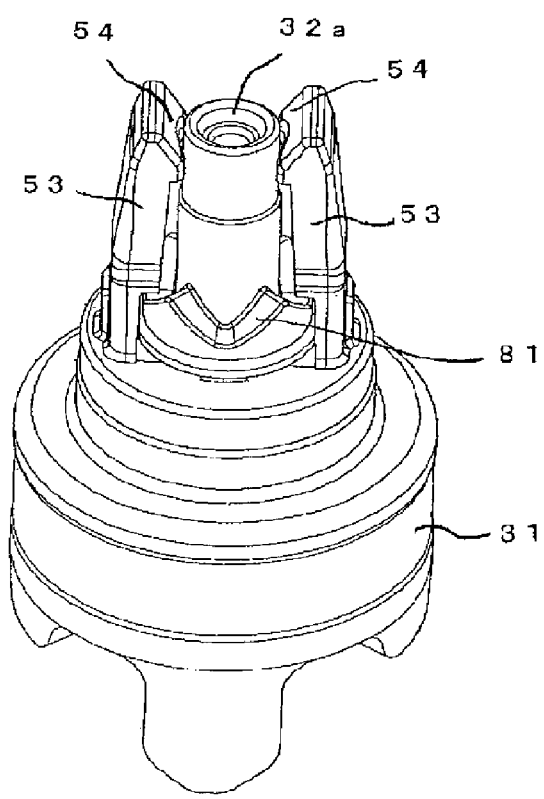

Width B of the retainer 53 of the coupling holding means 50 should preferably be the same or larger than the outer diameter of the nozzle portion. When the outer diameter of the projecting connecting portion 32 constituting the nozzle portion shown in FIG. 6 is, for example, 2.8 mm, the width of the retainer 53 should preferably be within a range from 2.8 mm to 4.0 mm. and distance L between the outsides of the retainers 53 should preferably be within a range from 6.0 mm to 10.0 mm. By making the coupling holding means 50 compact in this manner, the coupling holding means can be used with a coupler for small sized devices such as a mobile phone and portable type audio devices.

These values may be measured at a position at which they become largest within a range in which the coupling locking means is inserted in the socket.

When the coupled state between the socket S10 and the plug P10 should be maintained, the projecting connecting portion 32 constituting the nozzle portion of the plug P10 is inserted into the plug insertion opening 13 which is the opening of the socket S10 for inserting the plug and the retainers 53 which are the lock arms provided in the plug main body 31 are pushed into the engaging recess 51 constituting the insertion opening for the coupling holding means and toward the retainer engaging portions 52.

Accompanying the coupling operation between the socket S10 and the plug P10, contact between the retainer engaging portions 52 of the engaging recess 51 and the engaging pawl portions 54 of the retainers 53 causes the retainers 53 to elastically deform about the fulcrum of the thin portion 57 in such a manner that the retainers 53 are pushed back outwardly. As the plug P10 is further pushed into the socket S10, the retainer engaging portions 52 of the engaging recess 51 are engaged with the engaging pawl portions 54 of the retainers 53 by overriding each other and the coupled state can be maintained between the stepped portions of the engaging pawl portions 54 and the retainer engaging portions 52.

In this coupled state, the retainers 53 are rotatable about the central axis of the plug main body 31 through the ring portion 55 and, therefore, even if force is applied between the socket S10 and the plug P10 about the central axis, such force can be absorbed by rotation of the retainers 53 and damage to the coupler 10 can thereby be prevented.

When the coupler should be released from the coupled state, the plug P10 is pulled from the socket S10 and the slightly inclined portion of the engaging pawl portions 54 of the retainers 53 thereby are pushed by the retainer engaging portions 52 of the engaging recess 51 to elastically deform the retainers 3 in a manner to be pushed back outwardly. By further pulling the plug P10, the coupled state is released by an overriding action to release the plug P10 from the socket S10.

In this coupler 10, when twisting force is applied in the coupling maintained state by the coupling holding mean, this twisting force is absorbed by rotation of the ring portion 55 of the retainers 53 relative to the plug main body 31 and, in addition to that, a cam mechanism 80 is provided for automatically releasing the coupler from the coupling maintained state.

Figure 5:
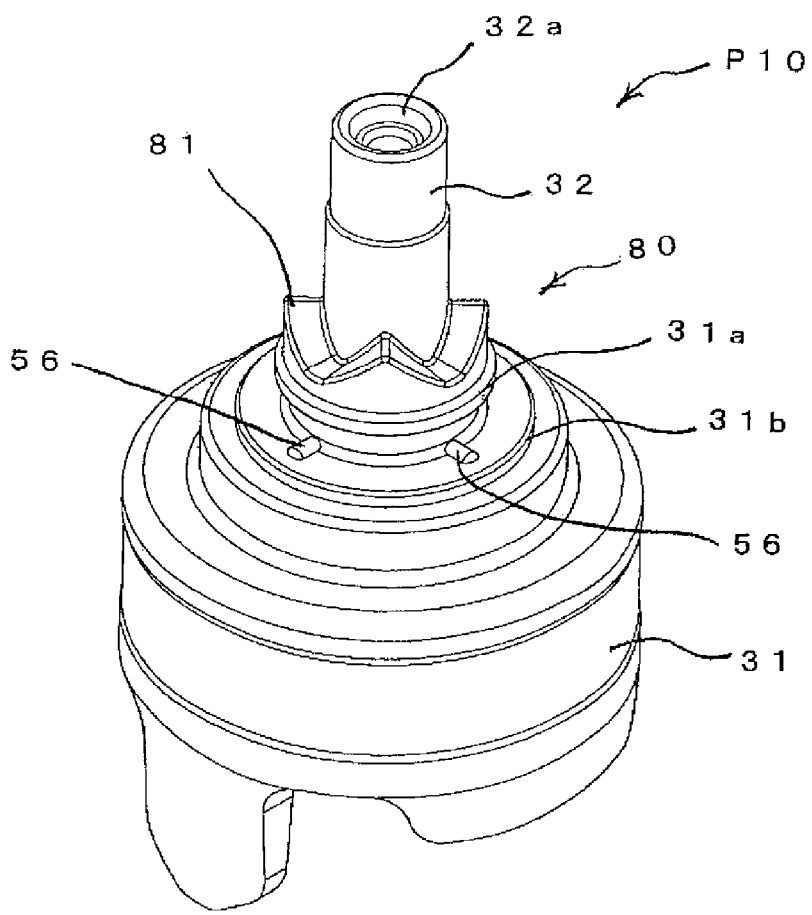
FIG. 5 is an explosive perspective view of a plug portion of the embodiment of the coupler.

As this cam mechanism 80, as shown in FIGS. 5 and 6, four cams 81 are formed at an equal interval (at an interval of 90 degrees) in the base portion of the projecting connecting portion 32 constituting the nozzle portion of the plug main body 31. Each of the cams 81 is formed as an end surface cam in which the two end portions in the circumferential direction are formed in an inclined surface and the central portion is formed in a curved surface. This cam 81 has a height that is sufficient for securing a lift amount which enables release of the plug P10 from the coupled state with the socket S10 in which the engaging pawl portions 54 of the retainers 3 are engaged with the retainer engaging portions 52 in the engaging recess 51 of the socket S10.

Figure 7A:
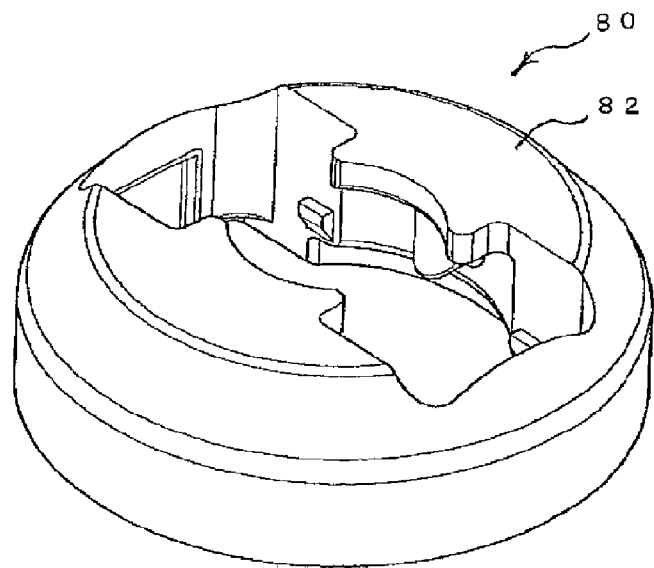
FIGS. 7A and 7B are a perspective view and a sectional view of a release ring portion of a cam mechanism of the embodiment of the coupler.
Figure 7B:
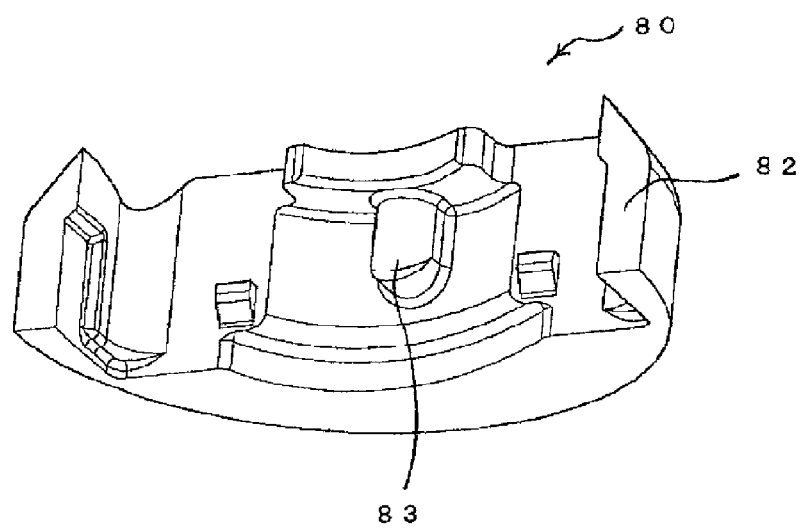

On the other hand, a release ring 82 is disposed on the retainers 53 in a manner to cover the outside of the retainers 53 from above and to be capable of moving in reciprocating motion. As shown in FIG. 7, two cam followers 83 in the form of projections are formed in diametrically opposed positions on the inside of the release ring 82 in a manner to contact and follow the cams 81.

The top surface of the release ring 82 faces the outer surface of the fuel cell main body F in the coupling maintained state.

Accordingly, when twisting force is relatively applied about the central axis in the coupling maintained state in which the retainer engaging portions 52 of the engaging recess 51 of the socket S10 are engaged with the engaging pawl portions 54 of the retainers 53, if the twisting force is relatively small, it will allow the ring portion 55 of the retainers 53 to rotates within an idling distance of the cam mechanism 80, whereas if a larger twisting force is applied, the cams 81 of the cam mechanism 80 are rotated by relative rotation between the socket S10 and the plug P10.

By this movement, the release ring 82 is lifted in axial direction, being guided by the retainers 53, via the cam followers 83 of the release ring 82 which are in contact with the cams 81. The top surface of the release ring 82 thereby abuts against the outer surface of the fuel cell main body F and relatively pull away the plug P10 from the socket S10. Hence the retainer engaging portions 52 of the engaging recess 51 of the socket S10 are disengaged from the engaging pawl portions 54 of the retainers 53 of the plug P10.

Accordingly, by this cam mechanism 80, in a case where twisting force is applied in rotational direction, damage can be prevented by the rotation of the ring portion 55 of the retainers 53 and, in addition to that, this twisting force produces force in axial direction to automatically release the coupler from the coupling maintaining state.

By this arrangement, when excessive twisting force exceeding normal range of use is applied, the plug P10 can be disengaged from the socket S10 safely and automatically without causing damage to the coupler 10 or to the main body of the device.

When the plug P10 is to be detached from the socket S10, the plug P10 can be detached from the socket S10 by twisting the plug P10 and thereby applying rotational force about the central axis by using the cam mechanism 80 and generating force to release the plug P10 in a simple manner.

Figure 10:
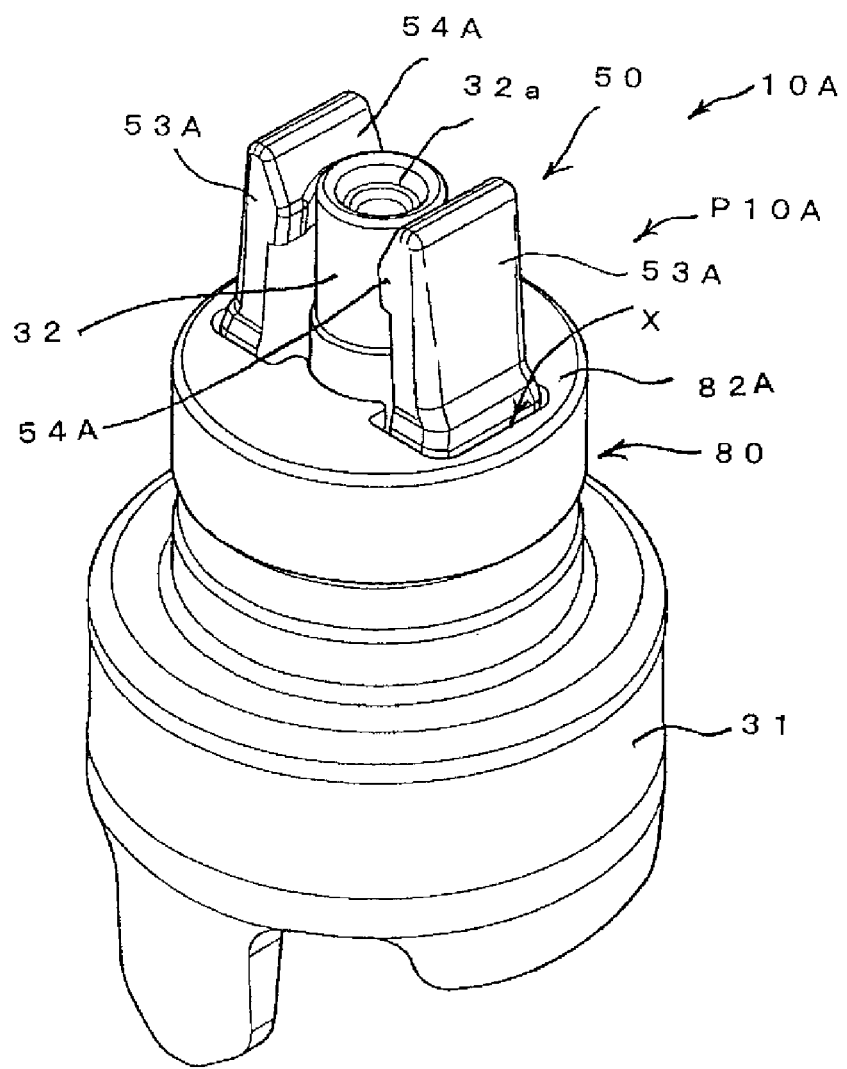
FIG. 10 is a perspective view of a plug of another embodiment of the coupler.
Figure 11A:
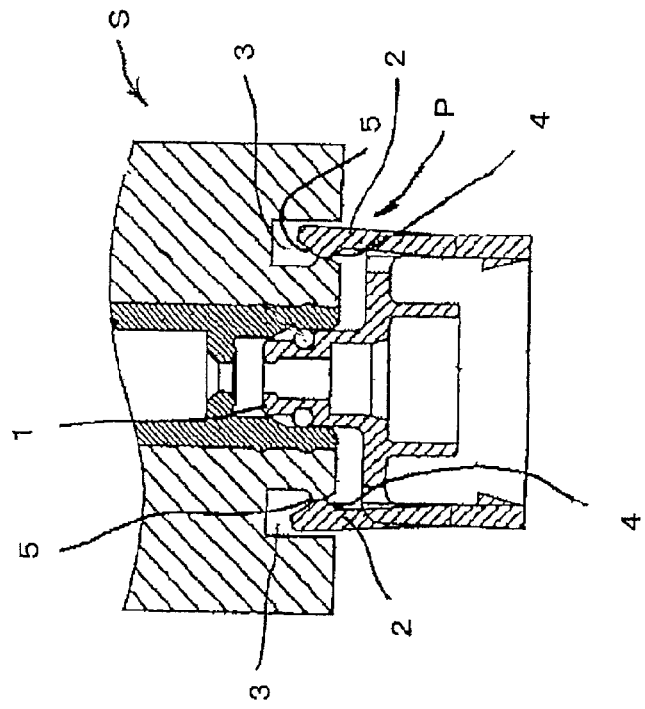
FIGS. 11A and 11B are vertical sectional view for explaining coupling holding means of a prior art coupler.
Figure 11B:
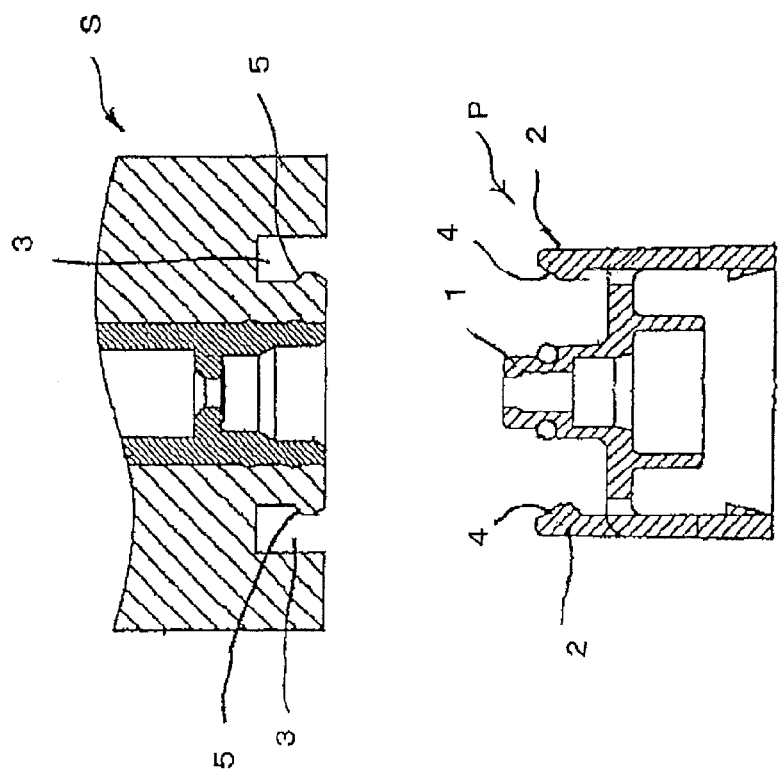
Figure 12:
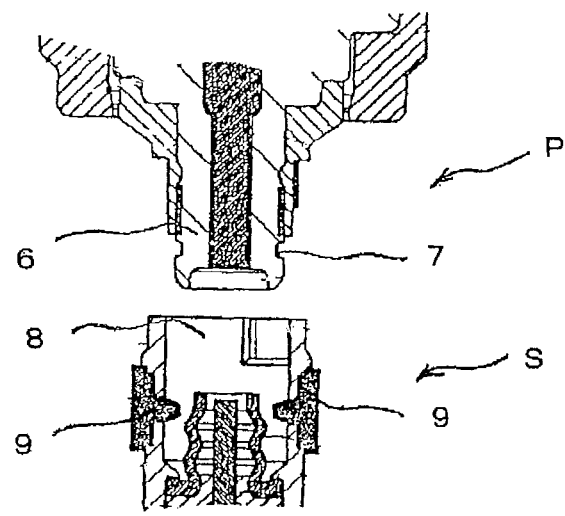
FIG. 12 is a vertical sectional view for explaining another coupling holding means of a prior art coupler.

Another embodiment of the coupler of the present invention will now be described with reference to FIG. 10. The same reference characters as those used in the previously described embodiments designate the same parts and overlapping description will be omitted.

In this coupler 10A, shapes of retainers 53A of the coupling holding means 50 of a plug P10A and a release ring 82A of the cam mechanism 80 are modified. More specifically, the shape of back surfaces of the retainers 53A and the shape of the inside portion of the release ring 82A are modified in such a manner that, when the retainers 53A are elastically deformed to expand outwardly in overriding of engaging pawl portions 54A of the retainers 53A over the retainer engaging portions 52 of the engaging recess 51, the back surfaces of the retainers 53A abut against the inside surface of the release ring 82A (i.e., portion X in the drawing) to resist the deformation.

By this arrangement, engaging force between the plug and the socket is increased and the coupled state can be maintained accurately.

As the field of application of this coupler, description has been made about a case where the coupler is used for coupling a container of methanol for a fuel cell with a main body but the field of application of the coupler is not limited to this but it may be used for various other purposes.

DESCRIPTION OF REFERENCE CHARACTERS 10 coupler
S10 socket
P10 plug
F member on the side of a fuel cell main body
11 socket holding frame member (insertion opening)
12 socket main body
13 plug connecting opening (insertion opening)
14 valve holder
15 socket side operation member
16 seal member
17 compressed coil spring
18 valve main body
31 plug main body
31a small diameter portion in a middle portion
31b large diameter portion in a middle portion
32 projecting connecting portion (nozzle portion)
33 plug side operation member
34 valve holder
35 compressed coil spring
36 valve main body
37 valve seal member
50 coupling holding means
51 engaging recess
52 retainer engaging portion
53 retainers
55 ring portion
56 overriding portion
57 thin portion
58 interference preventing portion
80 cam mechanism
81 cams
82 release ring
83 cam followers
10A coupler
51A engaging recess
53A retainers
82A release ring
54A engaging pawl portions
X abutting portion

What is claimed is:

1. A coupler comprising a socket having a valve and a first energizing means for energizing the valve in a closing direction, and a plug having a valve, a second energizing means for energizing the valve of the plug in a closing direction and a nozzle portion which is detachably fitted and coupled with the socket, said plug being capable of communicating with the socket by opening the valve of the plug and the valve of the socket in the fitted and coupled state, wherein a coupling holding means for holding the coupled state comprising a retainer and a retainer engaging portion is provided between the socket and the plug, a pair of said retainer are provided oppositely across the nozzle portion of the plug, a projecting engaging pawl portion which is engaged with the retainer engaging portion is formed in an inside portion of each of the opposing retainers, the pair of the engaging pawl portions of the retainers are provided at an interval which is equal to or smaller than an outer diameter of the nozzle portion, and the pair of said retainer are formed to extend farther than a foremost end portion of the nozzle portion; further wherein the retainers each have a cam mechanism which, when twisting force is applied in the engaged state of the retainers, releases the retainers from the engaged state.

2. The coupler as defined in claim 1 wherein the engaging pawl portions of the retainers are each formed with an interference preventing portion for preventing interference with the nozzle portion.

3. The coupler as defined in claim 1 wherein the retainers each have a thin portion in a middle portion which constitutes a fulcrum of elastic deformation and the engaging pawl portions of the retainers are formed as a thick portion.

4. The coupler as defined in claim 1 wherein the retainers are rotatable about the nozzle portion.

5. The coupler as defined in claim 4 wherein the retainers each have an overriding portion which restricts a position of rotation between the retainers and the nozzle portion.

6. The coupler as defined in claim 1 wherein the cam mechanism comprises a cam provided in the plug and a cam follower which is a release ring provided reciprocably in the retainers.

7. The coupler as defined in claim 1 wherein width of the retainers is within a range from 2.8 mm to 4.0 mm and distance between the outsides of the retainers is within a range from 6.0 mm to 10.0 mm.

8. The coupler as defined in claim 1 wherein the socket is mounted in substantially a central portion of an insertion opening for receiving the retainers and the retainer engaging portions are provided in a space outside of the socket whereby a recess in which the insertion opening and the retainer engaging portions are integrally formed is provided.

* * * * *